United States
Haas

3,816,127
June 11, 1974

[54] NOVEL IMAGING SYSTEMS CONTAINING OPTICALLY ACTIVE POLYSULFOXIDE GROUPS

[75] Inventor: Howard C. Haas, Arlington, Mass.

[73] Assignee: Polaroid Corporation, Cambridge, Mass.

[22] Filed: July 12, 1972

[21] Appl. No.: 270,973

[52] U.S. Cl. .................. 96/29 R, 96/76 R, 95/1 R, 350/154
[51] Int. Cl. ............................................. G03c 5/54
[58] Field of Search ................ 96/29, 76 R; 95/1 R; 350/154

[56] References Cited
UNITED STATES PATENTS

| | | | |
|---|---|---|---|
| 2,409,959 | 10/1946 | Ryan et al. | 96/29 |
| 2,458,168 | 1/1949 | Husek | 96/67 |
| 3,451,815 | 6/1969 | Morse | 96/29 |

OTHER PUBLICATIONS
Polymer Letters, Vol. 9, 241–245, 1971.

*Primary Examiner*—Norman G. Torchin
*Assistant Examiner*—John L. Goodrow

[57] ABSTRACT

An imaging system wherein an image is formed in terms of optical rotation which comprises exposing a photo-sensitive silver halide emulsion, contacting the exposed emulsion with a layer comprising an optically active polymeric sulfoxide and developing the latent image in the emulsion with a reagent which is a silver halide developing agent and which destroys the optical rotation provided by the sulfoxide group. An image is thus formed in the layer superposed on the emulsion layer by destruction of the optical rotation of the sulfoxide by contact with unexhausted developer. The image is viewed between rotatable polarizers.

9 Claims, No Drawings

NOVEL IMAGING SYSTEMS CONTAINING OPTICALLY ACTIVE POLYSULFOXIDE GROUPS

BACKGROUND OF THE INVENTION

Sulfoxides, i.e., groups represented by the formula:

are known to be of stable pyrimidal structure and have been resolved to pairs of optically active isomers when the substituents on the sulfur atom are different. The term "optically active" as used herein is intended to refer to the ability of the compound to rotate incident plane polarized light. Such sulfoxide groups have been incorporated into monomers, for example, optically active p-tolyl vinyl sulfoxide, which has its optically active center located at the sulfur atom. Such monomers have been prepared by the reaction of an optically active sulfinate ester with Grignard reagents. For example, p-tolyl vinyl sulfoxide has been prepared by the reaction of vinyl magnesium chloride with S(—)-menthyl- )-p-toluene sulfinate in tetrahydrofuran. The monomer showed high optical rotatory power, $[\alpha]_D^{23} = +443°$ in acetone.

The illustrated monomers containing the optically active sulfoxide group may be homopolymerized or copolymerized with other ethylenically unsaturated monomers to provide polymeric films with a variety of properties. The term "polymeric sulfoxide" as used herein will refer to a polymeric chain having pendant sulfoxide groups therein.

It is known that the optical activity of the compounds can be destroyed by a variety of methods, for example, oxidation to the sulphone or reduction to the sulfide. Additional details on the preparation and reactions of monomers and polymers containing optically active sulfoxide groups may be found in POLYMER LETTERS, Vol. 9, pp. 241–245 (1971) and Journal of Polymer Science, Part A-1, Vol. 8, pp. 2293–2308 (1970). It has now been found that novel imaging systems can be provided utilizing the properties of the above-described polymeric sulfoxides.

SUMMARY OF THE INVENTION.

In image is formed in terms of optical rotation in a sheet which comprises areas containing an optically active polymeric sulfoxide and areas where the centers of optical rotation have been at least partially destroyed. The sheet is placed between two polarizers where, by the relative angle of rotation of the two polarizers with respect to each other, the image imposed on the sheet will be ascertainable.

DETAILED DESCRIPTION OF THE INVENTION

Images are formed in terms of optical rotation by contacting an exposed black and white silver halide emulsion layer with a receiving layer comprising a sheet containing an optically active polymeric sulfoxide and then contacting the silver halide emulsion layer with a developer which also reacts with the polymeric sulfoxide to destroy at least a portion of the optical rotation. In the exposed areas of the emulsion layer, the developer is used up by reaction with the exposed silver halide grains. In unexposed areas, the unreacted developer transfers to the receiving sheet containing the polymeric sulfoxide and destroys the centers of optical rotation, providing an imagewise distribution of reduced sulfoxide, i.e., optically inactive sulfides. The image in the receiving layer is then viewed between polarizers wherein at least one is rotatable.

The image provided by the novel system of the present invention is observed by placing the receiving layer, i.e., the layer which initially contains a uniform distribution of polymeric sulfoxide, between polarizers. In areas which are not contacted by unexhausted developer, i.e., areas of a greater degree of exposure in the silver halide emulsion layer, a certain finite value for light transmission will be observed which represents the ability of the optically active material to rotate the light from one of the polarizers as it is incident on the polymeric sulfoxide layer. In areas of no exposure where a relatively large quantity of unexhausted developer is available during development of the emulsion, optically active centers in that area will be destroyed. When viewed between crossed polarizers, these areas will indicate total extinction. Varying degrees of exposure of the silver halide emulsion layer will result in correspondingly varied degrees of the aforementioned polarized light transmission.

It should be understood that the polarizers may be initially set, i.e., prior to formation of the image in the polymeric sulfoxide layer, to provide either maximum extinction or maximum transmission of incident light in combination with the polymeric sulfoxide layer. Thus, after the image was formed in terms of destruction of rotatory power of given areas of the polymeric sulfoxide layer, a negative or positive image would be observed depending upon whether the system was initially arranged maximum extinction or maximum transmission. If set for maximum extinction, the image would be considered a negative image; if set for maximum transmission, the image would be considered a positive image.

The present invention contemplates a variety of structures for the imaging systems of the present invention, as well as methods of processing such structures. For example, a silver halide emulsion layer may be exposed and then brought into contact with a polymeric sulfoxide layer for further processing. After formation of the image in the polymeric sulfoxide layer, the emulsion layer is removed and the polymeric sulfoxide layer inserted between polarizers.

Alternatively, a combination element comprising a polymeric sulfoxide layer and a silver halide emulsion may be exposed with the emulsion layer being detached subsequent to processing, and the polymeric sulfoxide layer then inserted between polarizers as indicated above.

In still another embodiment, an integral polarizer and a polymeric sulfoxide layer comprise the receiving element which is brought into contact with an exposed silver halide emulsion layer. In still another embodiment, an element comprising, in order, a polarizer, a layer of polymeric sulfoxide and a silver halide emulsion layer, is exposed through the side carrying the emulsion layer and processed to form the image in the polymeric sulfoxide layer. The emulsion is then removed and a second polarizer placed adjacent the polymeric sulfoxide layer.

With the foregoing description in view, other constructions will be obvious. The above layers may be either self-supporting or mounted on a suitable inert, permeable support.

It has been stated above that the developer may at least partially destroy the center optical rotation in a given area. It should be understood that the extent to which the ability to rotate polarized light is destroyed, is predetermined by a number of factors selected by the operator; for example, the amount of silver halide in the emulsion, the particular developer and its concentration, the thickness of the receiving layer and the concentration of sulfoxide group.

Because only three groups serve to make up the optically active center in the sulfoxide radical, it will be seen that a high degree of resolution can be obtained in the images obtained by the present invention. The resolution is defined by the atomic dimension of the sulfoxide groups and the distance between groups.

It is preferred that the polymeric sulfoxide be disposed in a clear transparent layer. The layer must, of course, be permeable to the developing composition in order to permit the destruction of the centers of optical activity in the given areas by the unexhausted reagent. The layer may be composed solely of a polymeric sulfoxide as a self-supporting layer or the polymeric sulfoxide may be copolymerized with other suitable ethylenically unsaturated comonomers to provide the desired properties such as permeability to the developing composition, rigidity, clarity and the like. Alternatively, a layer of polymeric sulfoxide may be applied to a transparent support. The support must be non-birefringent and not optically active.

As described above, the images are formed in the polymeric sulfoxide layer by exposing a silver halide emulsion and then placing the silver halide emulsion layer in contact with the polymeric sulfoxide layer. A developing composition is then applied to the emulsion layer, which composition includes a material which is both a discriminating developer for the exposed silver halide grains and which will also react with the sulfoxide group to form the sulfide which is an optically inactive species.

The polymeric sulfoxide may comprise a copolymer with other material selected to provide various properties at the option of the operator.

In addition to employing the silver halide emulsion layer which is exposed separately from the polymeric sulfoxide layer and then brought into superposition subsequent to exposure, the present invention also contemplates an imaging element which initially employs the silver halide emulsion layer in contiguous relationship to the polymeric sulfoxide layer prior to exposure. Subsequent to exposure and processing and the forming of the image in the polymeric sulfoxide layer, the silver halide emulsion layer may be left in position. Preferably, however, the emulsion layer is detached from the polymeric sulfoxide layer by, for example, stripping or washing. It may be desirable to employ a conventional stripping layer intermediate the emulsion and the polymeric receiving layer.

As stated above, the developer employed in the present invention is a discriminating developer for silver halide which will also react with the sulfoxide groups modifying the optical rotatory ability of the groups. As an example of a suitable developer, mention may be made of titanous trichloride together with appropriate complexing agents. (See, for example, British Pat. No. 720,235.)

In order to further illustrate the novel system of the present invention, an example of the process will be described.

A layer of poly-(p-tolylvinyl sulfoxide) having a molecular weight of about 2400 and an optical rotation of about $[\alpha]_D^{23}$ of $+194°$ (in acetone) may be prepared according to the procedures described above and cast on a transparent polymeric support. A silver halide emulsion layer may be exposed to an image and then placed in superposition with the above-described polymeric sulfoxide layer. An aqueous acid solution containing a titanous trichloride may then be applied to the silver halide emulsion layer. Subsequent to image formation in the polymeric sulfoxide layer, the silver halide emulsion layer may be detached from the polymeric sulfoxide layer. The polymeric sulfoxide layer will then be observed between crossed polarizers and an image viewed in terms of gradations of light transmission provided by the selective destruction of centers of optical activity in areas corresponding to the unexposed areas of the silver halide emulsion layer.

Novel imaging systems of the present invention are particularly suited for employment in identification cards or badges wherein the specific information can be imparted to the badge but cannot be ascertained without examination of the badge between polarizers of a predetermined degree of rotation which are employed by the security personnel. Alternatively, the badges may be inserted into a device equipped with polarizers which would automatically ascertain the appropriateness of the coded information, actuating suitable devices such as locks, alarms and the like. The described identification badges may be composed solely of a clear plastic, transparent material where the information is recorded solely in terms of the optical rotation of the polymeric sulfoxide layer, or the polymeric sulfoxide layer may comprise only a small area of a conventional badge which contains visible indicia of identification.

The present invention is also suitable for the preparation of animated cartoons.

What is claimed is:

1. A method for forming images in terms of optical rotation, which comprises:
    a. exposing a photosensitive silver halide emulsion layer;
    b. contacting said exposed silver halide emulsion layer with a receiving layer comprising an optically active polymeric sulfoxide;
    c. contacting said exposed silver halide emulsion layer with titanous trichloride which is a silver halide developing agent which is also capable of reacting with the sulfoxide layer to destroy the centers of optical rotation whereby unreacted developer in the unexposed areas of the silver halide emulsion areas diffuses to said adjacent polymeric sulfoxide layer providing an imagewise distribution of reduced sulfoxide groups;
    d. removing said silver halide emulsion layer from contact with said receiving layer; and
    e. viewing said receiving layer between polarizers.

2. A method as defined in claim 1 wherein said polarizers are initially arranged with respect to each other to provide maximum extinction.

3. A method as defined in claim 1 wherein said polarizers are arranged with respect to each other to provide maximum transmission.

4. A method as defined in claim 1 wherein said polymeric sulfoxide is p-tolyvinyl sulfoxide.

5. A novel product which comprises a photosensitive silver halide emulsion layer and a layer of polymeric sulfoxide.

6. A product as defined in claim 5 which includes a stripping layer intermediate said silver halide emulsion layer and said polymeric sulfoxide layer to facilitate separation of said layers.

7. A product as defined in claim 5 which includes a light polarizing element on said polymeric sulfoxide layer opposite said silver halide emulsion layer.

8. A product as defined in claim 5 which includes an optically inactive non-birefringent transparent support.

9. A product as defined in claim 5 wherein said polymeric sulfoxide layer comprises a layer of poly-(p-tolylvinyl sulfoxide).

* * * * *